United States Patent
Laude

[11] Patent Number: 5,808,765
[45] Date of Patent: Sep. 15, 1998

[54] MULTIPLEXER-DEMULTIPLEXER FOR OPTICAL WAVELENGTHS

[75] Inventor: Jean-Pierre Laude, Longjumeau, France

[73] Assignee: Instruments, S.A., Paris, France

[21] Appl. No.: 612,189

[22] Filed: Mar. 7, 1996

[30] Foreign Application Priority Data

Mar. 7, 1995 [FR] France .................. 95 02649

[51] Int. Cl.⁶ .................. H04J 14/02
[52] U.S. Cl. .................. 359/130; 385/37
[58] Field of Search .................. 385/37; 359/634, 359/130, 131

[56] References Cited

U.S. PATENT DOCUMENTS

| | | | |
|---|---|---|---|
| 4,111,524 | 9/1978 | Tomlinson, III | 359/131 |
| 4,299,488 | 11/1981 | Tomlinson, III | 356/328 |
| 4,583,820 | 4/1986 | Flamand et al. | 359/130 |
| 4,622,662 | 11/1986 | Laude et al. | 359/131 |
| 4,703,472 | 10/1987 | Blumentritt et al. | 359/131 |
| 4,739,501 | 4/1988 | Fussaganger | 359/131 |
| 4,741,588 | 5/1988 | Nicia et al. | 359/131 |
| 4,748,614 | 5/1988 | Dammann et al. | 359/131 |
| 4,784,935 | 11/1988 | Ehrfeld et al. | 359/130 |
| 4,926,412 | 5/1990 | Jannson et al. | 370/3 |

FOREIGN PATENT DOCUMENTS

| | | |
|---|---|---|
| 0 112 234 | 6/1984 | European Pat. Off. . |
| 36 06 682 | 11/1987 | Germany . |
| 59-170815 | 9/1984 | Japan . |
| 0137805 | 5/1990 | Japan . |
| 91/13377 | 9/1991 | WIPO . |

OTHER PUBLICATIONS

Watanabe et al., "Optical Demultiplexer Using a pin Photo–Diode Detector Array", *the Transactions of the IECE of Japan*, vol. E.64:2, pp. 92–93, 1981.

J–P Laude et al., "Wavelength division multiplexing/demultiplexing (WDM) using diffraction gratings", *SPIE*, vol. 503, pp. 22–27, 1984.

*Primary Examiner*—Leslie Pascal
*Attorney, Agent, or Firm*—Millen, White, Zelano, & Branigan, P.C.

[57] ABSTRACT

The present invention relates to a multiplexer-demultiplexer for optical wavelengths comprising:

endpoints of input-output lines ($22_1$, $22_2$, ..., $22_n$), an endpoint of a transmission line (23), a diffraction network with a diffraction plane and, an optical system ensuring the optical conjugation between the input-output lines ($22_1$, $22_2$, ..., $22_n$) and the endpoint of the transmission line (23), The endpoints of the input-output lines ($22_1$, $22_2$, ..., $22_n$) are aligned along a straight line parallel to the diffraction plane and the endpoint of the transmission line (23) is offset transversally with respect to said straight line.

12 Claims, 5 Drawing Sheets

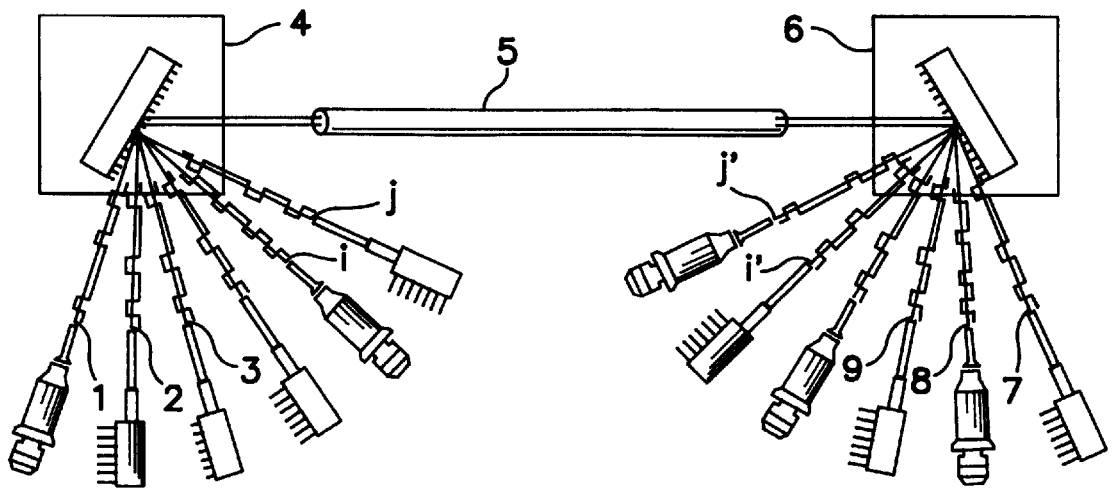
FIG. 1
PRIOR ART
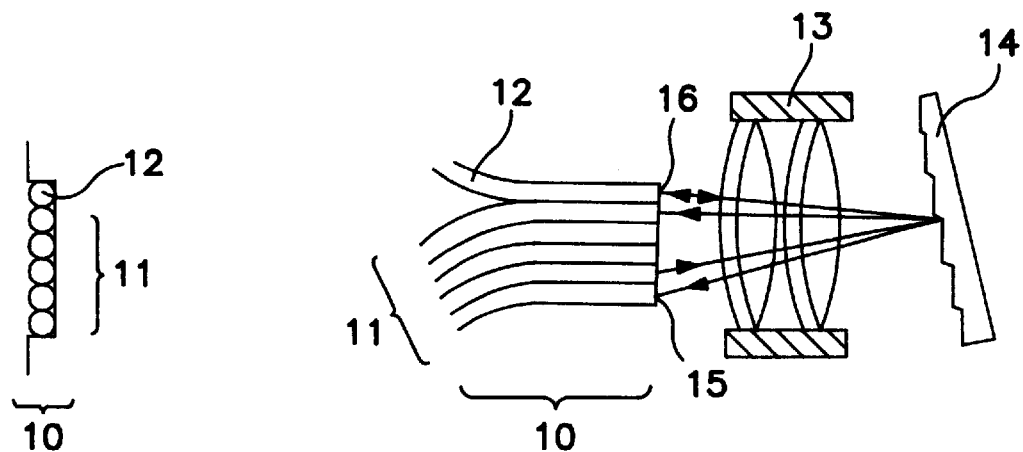
FIG. 2B
PRIOR ART
FIG. 2A
PRIOR ART

MULTIPLEXER-DEMULTIPLEXER FOR OPTICAL WAVELENGTHS

FIELD OF THE INVENTION

The present invention relates to a multiplexer-demultiplexer for optical wavelengths.

BACKGROUND OF THE INVENTION

The optical transmission of information by fibres is developing very rapidly, both for specialized medium and short-range links and for long-distance networks such as subscriber telephone networks.

It is well known that in such systems, the rate of information transmitted can be increased by wavelength multiplexing. Such multiplexing, represented in FIG. 1, consists of superposing optical signals of different wavelengths on the same transmission line or fibre, in general single-mode. The signals carried by the fibres or input-output lines 1, 2, 3, i, j, respectively at wavelengths $\lambda_1$, $\lambda_2$, $\lambda_3$, $\lambda_i$, $\lambda_j$, are superposed in the multiplexer 4, transmitted simultaneously in fibre 5 in one direction or the other, then demultiplexed by the demultiplexer 6 in such a way as to provide once again in fibres 7, 8, 9, i' and j', differentiated signals at the respective wavelengths $\lambda_1$, $\lambda_2$, $\lambda_3$, $\lambda_i$, $\lambda_j$.

In such systems, it is known that devices of the same structure can be used as multiplexer and demultiplexer because of the principle of inverse propagation of light.

The device, here called a multiplexer-demultiplexer for optical wavelengths, is thus suitable for fulfilling the function, either of multiplexer or demultiplexer, depending on the way in which it is used. The same component often fulfills the role of both multiplexer for input lines and demultiplexer for output lines, such as represented in FIG. 1.

Different types of multiplexer-demultiplexer have been described and used. The invention relates more particularly to a diffraction network multiplexer-demultiplexer whose general principle is shown in FIGS. 2A and 2B.

A comb of fibres 10 comprises an assembly of input-output fibres 11 and a transmission fibre 12. Each of the input-output fibres 11 carries a signal of wavelength $\lambda_i$, and the transmission fibre 12 transmits the whole signals, whatever their wavelength. An optical system 13 and a diffraction network 14 working in reflection ensure the optical conjugation of each of the endpoints 15 of the input-output fibres 11 with the endpoint 16 of the transmission fibre 12, at wavelength $\lambda_i$ of the flux transmitted by fibre 11.

The features of the network, the wavelengths $\lambda_i$ and the respective positions of the endpoints of the fibres 15 and 16 are adapted so as to achieve this conjugation.

Such devices have been used and have made possible the transmission of multiplexed signals. However, difficulties have appeared during the transmission of multiplexed signals over long distances, that is to say a significant weakening of the level of the signal between the multiplexer and demultiplexer, or between two repeaters. In fact, it has then appeared that such a multiplexer is liable to provide a signal accompanied by noise or a high parasite level.

In particular, when the end-components comprising the endpoints of the input-output lines comprise both input lines and output lines, the fluxes emitted by the input sources or lines, which are not completely monochromatic, can provide parasitic signals received by the detectors or output lines.

SUMMARY OF THE INVENTION

An object of the invention is to provide a multiplexer whose utilization allows the transmission of multiplexed signals with a reduction in noise level or parasitic signals.

The invention relates to a multiplexer-demultiplexer for optical wavelengths comprising:
  endpoints of input-output lines,
  an endpoint of a transmission line,
  a diffraction network with a diffraction plane and,
  an optical system ensuring the optical conjugation between the endpoints of the input-output lines and the endpoint of the transmission line.

According to the invention, the endpoints of the input-output lines are aligned along a straight line parallel to the diffraction plane and the endpoint of the transmission line is offset transversally in relation to said straight line.

This arrangement makes it possible at the same time to limit the aberrations spotting the images from the ends of the fibres through the optical system and the network, and the parasitic effects probably associated with the images produced by each of the endpoints of the input fibres, either on different orders from order 1 of the network, or at wavelengths not corresponding to the central emission frequency, corresponding for example to secondary modes of the emission spectrum of the source.

This multiplexer-demultiplexer is particularly well adapted to transmission by a single line of signals carried by several input-output lines. Advantageously, the endpoints of the input-output lines are thus equidistant, each endpoint of the input-output lines being at a distance d, in the diffraction plane, from the neighboring endpoints thereof.

The transversal offset of the transmission line is then preferably greater than the distance d.

In a preferred embodiment, besides the transversal offset, the endpoint of the transmission line is laterally distant from the closest of the endpoints of the input-output lines by at least 3d.

In different embodiments, the input and output lines can be fibres, the line endpoints then being constituted by the endpoints of the optical fibres.

The input lines can also be emitters, for example diode lasers, amplification fibres, fibre lasers etc., and the output lines can each be a photo-receivers. Together they can form a photodiode array.

The optical system and the network are chosen in such a way as to constitute a system producing very small aberrations, so as to avoid losses of luminous energy between input lines and output lines. This absence of aberrations becomes more difficult to obtain as the number of paths, that is input-output lines, increases.

To this effect, it is preferable to use a device in which the network is a plane network working in reflection, the optical system is a spherical mirror whose focus is on the network, the endpoints of the input-output lines and the transmission line being close to the centre of the mirror. The network is inclined and works according to its blaze order.

A preferred embodiment of such an optical device consists of the formation of the spherical mirror and the network, at the endpoints of a glass block called the first glass block.

When the line endpoints are optical fibres, these are preferably fixed to a second block of glass, integral with the first block of glass by glueing.

The first block of glass forming the spherical mirror and the network can be made of two elements which are glued together after the respective formation of the mirror and the network.

In another embodiment, the network and the optical system can be constituted of a single material assembly by a concave network with a plane field.

In a particular embodiment, the multiplexer-demultiplexer comprises several transmission lines.

BRIEF DESCRIPTION OF THE DRAWINGS

Different embodiments of the invention will now be described in detail, with reference to the appended drawings, in which:

FIG. 1 shows a device for transmitting data by wavelength multiplexing, known in prior art;

FIG. 2A represents a network multiplexer-demultiplexer for optical wavelengths, known in prior art;

FIG. 2B represents, laterally, the arrangement of the endpoints of the input-output and transmission lines in the device of FIG. 2A;

DETAILED DESCRIPTION OF THE PREFERED EMBODIMENT

Figure 3:
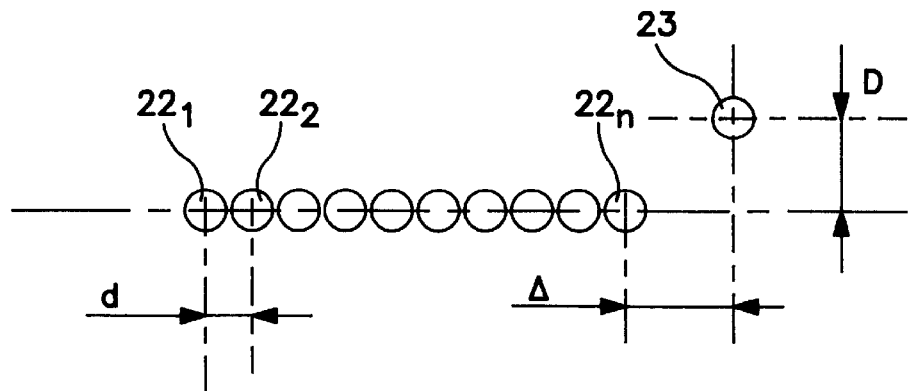
FIGS. 3, 3a and 4 each represent an embodiment of the invention for a 1n multiplexer-demultiplexer.

FIG. 3 represents a multiplexer in which the input-output fibres $22_1$, $22_2$, . . . ,$22n$ carry the signals which are superposed by the multiplexer on the single transmission fibre 23.

In order to produce such multiplexer-demultiplexers, the diameter of the cladding is thus made smaller and, for example, reduced to 50 μm at its endpoint.

The transmission fibre 23 is offset perpendicularly to the diffraction plane with regard to the straight line joining the cores of the different input-output fibres by a distance D, D being at least equal to 50 μm and, for example, being of the order of 88, which is equivalent to 714d. In addition, the transmission fibre 23 is offset laterally, parallel to the diffraction plane, by a distance Δ from the endpoint of the closest input-output line $22_n$. Preferably, Δ is of the order of several hundreds of micrometers, for example, Δ is equal to 250 μm which is equivalent to 5d. is This multiplexer-demultiplexer can operate in different wavelength fields. It is advantageous to operate it with wavelengths between 1,530 and 1,580 nanometers, the wavelengths flowing by the different input-output lines being equidistant and separated by about 1 nanometer.

Figure 4:
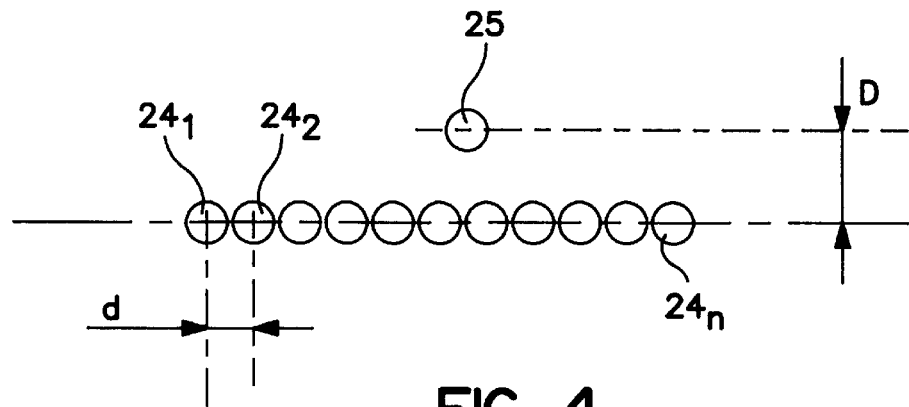

In another embodiment shown in FIG. 4, the endpoints of the input-output lines $24_1$, $24_2$, . . . ,$24_n$ are arranged in the manner described reference to FIG. 3. The transmission line 25 is centred in the direction of the diffraction plane, in relation to the assembly of the input-output lines $24_1$, $24_2$, . . . ,$24_n$ and is offset perpendicularly to this plane by a distance D. D is here again equal, for example, to 88 μm.

Figure 5:
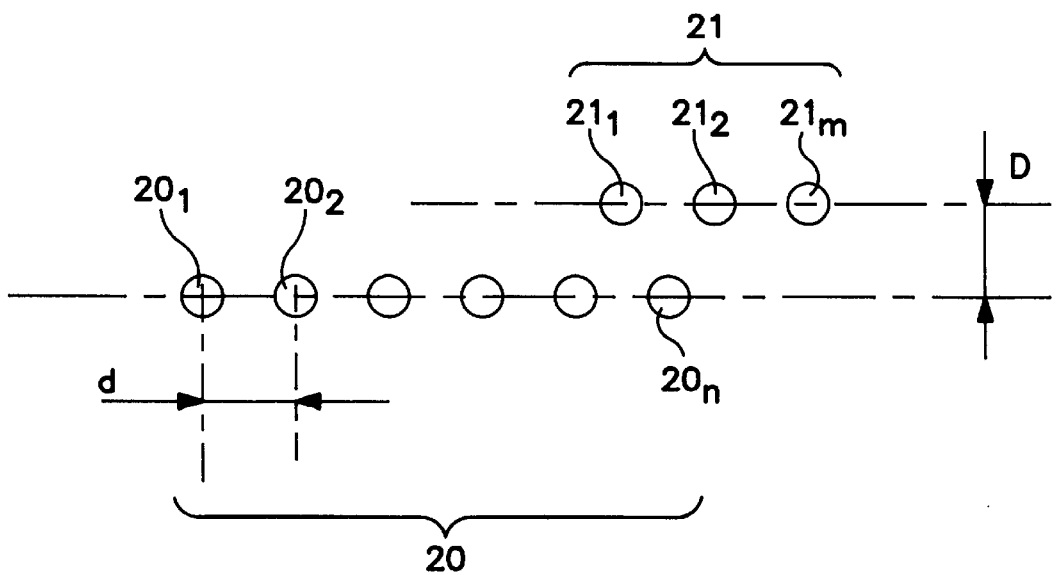
FIG. 5 represents the arrangement of the input-output and transmission lines of a n, m multiplexer-demultiplexer according to the invention.
Figure 3A:
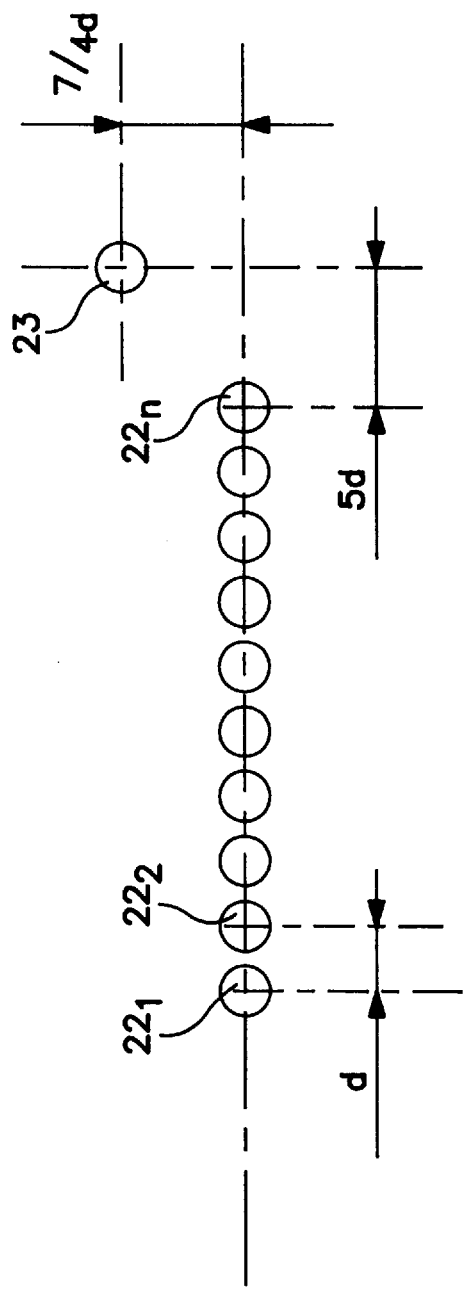

FIG. 5 shows the respective positions according to the invention of the endpoints of the lines, respectively, of input-output 20 and transmission 21 of a n-m multiplexer-demultiplexer.

The endpoints of these lines $20_1$, $20_2$, . . . ,$20_n$ form the assembly of input-output lines, while the endpoints $21_1$, $21_2$, . . . ,$21_m$ are the endpoints of the transmission lines.

The endpoints of the input lines among the endpoints of the input-output lines $20_1$, $20_2$, . . . ,$20_n$ can be either the endpoints of optical fibres or emitters such as diode lasers, amplification fibres, fibre lasers etc.

The endpoints of the output lines can be photo-receivers, for example constituted by an array of photodiodes, or fibre endpoints.

The endpoints of the input-output lines and the endpoints of the transmission lines can be several dozen in number, the endpoints of the lines being represented as a side view, in a plane perpendicular to the optical axis. The endpoints of the input-output lines, on the one hand, and the endpoints of the transmission lines, on the other hand, are uniformly distributed along a straight line.

Here again, the distance d between two consecutive fibres, in the diffraction plane, is for example of the order of 50 μm for single-mode fibres with a core whose diameter is 10 μm and whose cladding has a diameter of the order of 125 μm.

The distance D separating the parallel straight lines linking, respectively, the endpoints of the input-output lines and the endpoints of the transmission lines, is greater than 50 μm and preferably between 80 μm and 100 μm.

Figure 6:
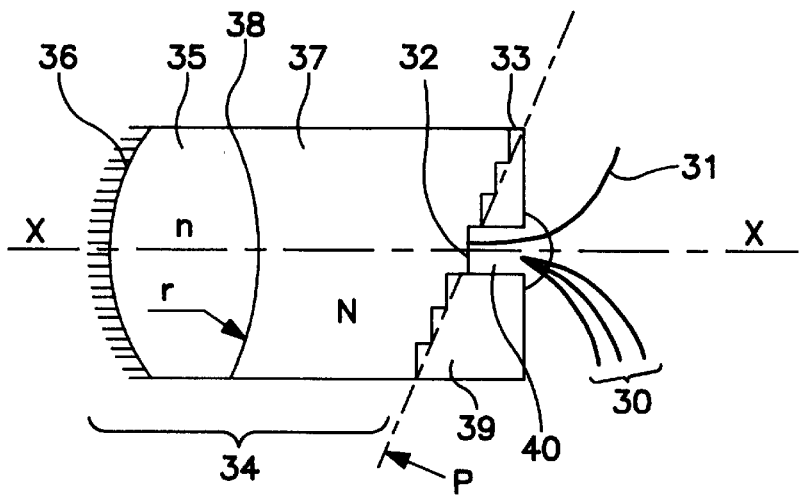
FIG. 6 represents a first embodiment of a multiplexer demultiplexer according to the invention.

FIG. 6 is a side view of a reflecting optical system—diffraction network assembly, making possible the production of the multiplexer-demultiplexer of the invention, whatever the number and arrangements of the endpoints of the input-output and transmission lines.

The lines are shown here as being constituted of optical fibres.

The input-output fibres 30 address signals superposed on the transmission fibre 31.

The endpoints 32 of these fibres are placed in the plane P of the network 33 at its intersection with the axis XX of the optical system 34.

This optical system is constituted of a first block of glass composed of a 25 first element 35 whose rear face carries a spherical mirror 36, and a second element 37 whose front face carries the reflecting network 33. These two elements, with optical indexes of n and N respectively, are linked by glueing at the level of the dioptre 38.

The fibres 30, 31 are carried by a second block of glass 39 provided with an opening 40. The fibre comb is formed by fibres 31 and 30 which are advantageously glued in the opening 40.

The aberrations of this optical device are very small since the concave mirror 36 is used with an object and an image close to its axis. The choice of indexes, respectively n of the first element 35 and N of the second 37 and of the radius of curvature r of the interface 38 allows these aberrations to be corrected. These aberrations are sometimes sufficiently small that it is possible in most of the embodiments to tolerate n=N and/or a plane interface 38. The first and second elements can then be made in a single block. In this latter case, these aberrations can be practically eliminated by providing a parabolic mirror 36. Preferably, in order to avoid direct reflection of light, non-dispersed, onto the input-output optical fibres, after the first passage on the mirror, the centre thereof is non-reflecting over a few square millimeters, or less.

The network operates under Littrow conditions.

Figure 7:
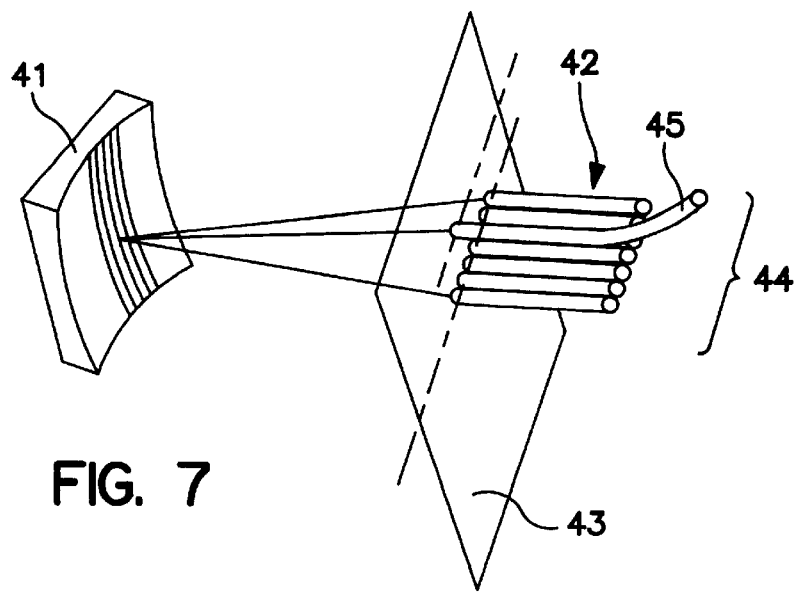
FIG. 7 represents a second embodiment of a multiplexer-demultiplexer according to the invention.

Another multiplexer embodiment which is also suitable for the different localizations of fibres represented in FIGS. 3 to 5 and described above, is shown in FIG. 7.

A unique optical component 41 is a spherical reflecting network, preferably with a plane field.

The wafer of fibres 42 is placed in the plane field 43. This wafer of fibres comprises an assembly of input-output fibres 44 and a single transmission fibre 45. The network is advantageously corrected from aberrations by plotting on special machines or by holographic recording.

Figure 8:
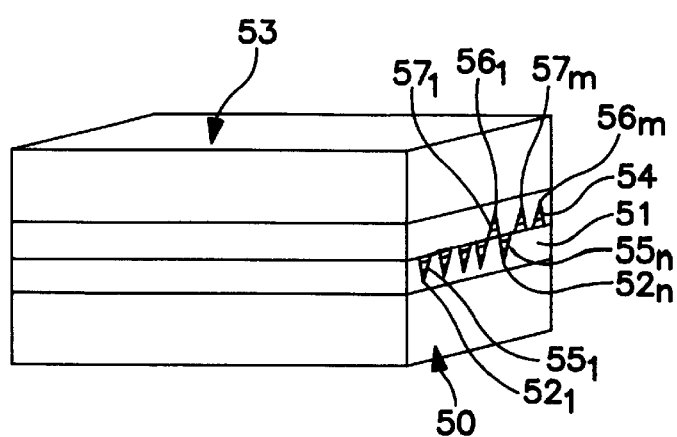
FIG. 8 represents an embodiment of a comb of optical fibres set up according to the invention.
Figure 6A:
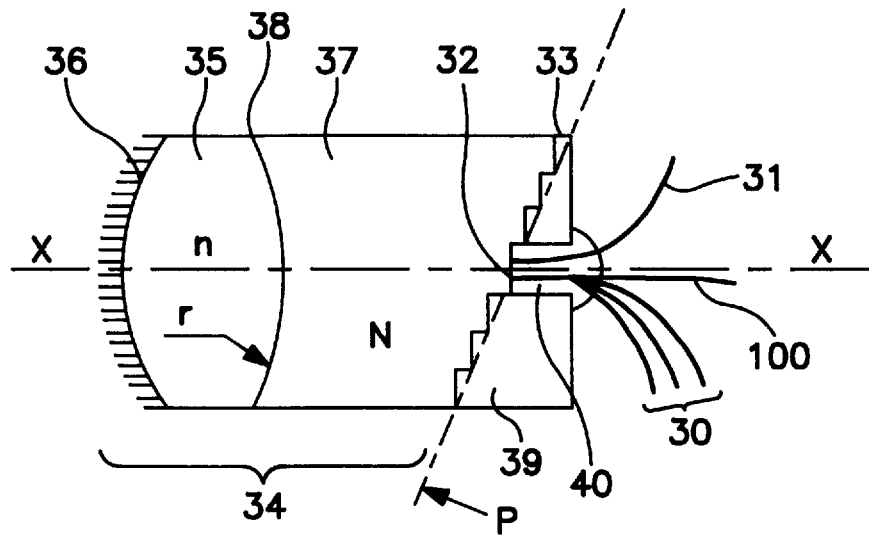
FIG. 6a shows a multiplexer-demultiplexer with emitters as input lines.
Figure 6B:
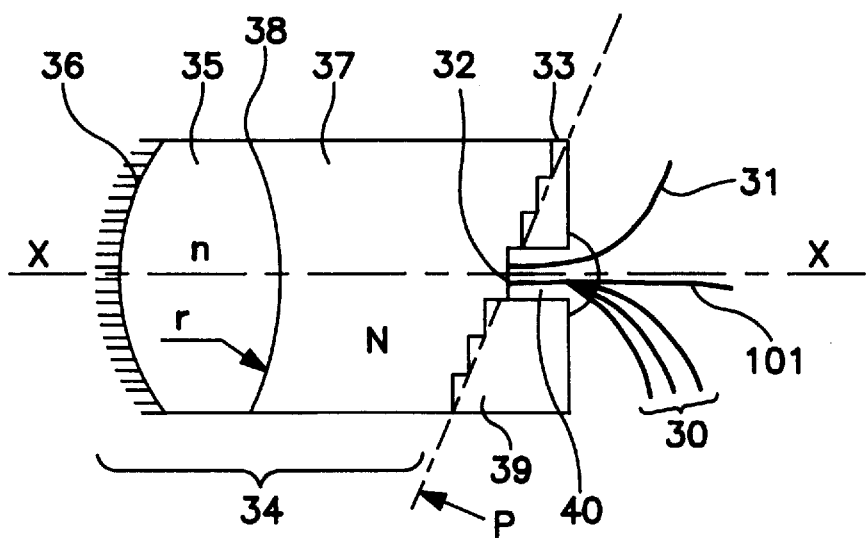
FIG. 6b shows a multiplexer-demultiplexer with photo-receivers as output lines.

FIG. 8 represents an embodiment of a wafer of fibres such as that operating according to the invention and which makes it possible to ensure a precise positioning of the input-output and transmission fibres with relation to each other.

A glass substrate 50 is covered with a uniform layer of resin 51.

Guide-vees $55_1, \ldots, 55_n$ n are formed in this layer of resin and can receive a first assembly of fibres which is fixed there by glueing.

Similarly, a second glass substrate 53 is covered with a layer of resin 54 in which guide-vees $56_1, \ldots, 56_m$ are formed, designed to receive a second assembly of fibres, for example the output fibres $57_1, \ldots, 57_m$. The two blocks 53 and 50 are then associated and form the wafer of fibres which is utilizable according to the invention, for example with the devices described and referred to in FIGS. 6 and 7. This assembly of two blocks is positioned, when in use, in relation to the optical system (34, 41).

What we claim is:

1. Multiplexer-demultiplexer for optical wavelengths comprising:

a diffraction network with a diffraction plane, endpoints of input-output lines aligned along a straight line parallel to the diffraction plane and equidistant, each endpoint being at a distance d, in the plane of diffraction, from the neighbouring endpoints thereof, an endpoint of a transmission line offset transversally in relation to said straight line by a distance greater than d, and an optical system ensuring the optical conjugation of the endpoints of the input-output lines with the endpoint of the transmission line, wherein said endpoint of the transmission line is laterally distant from the closest endpoint of the input-output lines by at least 3 d.

2. Multiplexer-demultiplexer according to claim 1, wherein the distance of transverse offset is approximately equal to d, and the lateral distance approximately equal to 3 d.

3. Multiplexer-demultiplexer according to claim 1, wherein the distance of transverse offset is approximately equal to 7/4 d, and the lateral distance approximately equal to 5 d.

4. Multiplexer-demultiplexer according to claim 1, wherein the input-output lines are fibres.

5. Multiplexer-demultiplexer according to claim 1, wherein the input lines are emitters and the output lines are optical fibres.

6. Multiplexer-demultiplexer according to claim 1, wherein the input lines are fibres and the output lines, photo-receivers.

7. Multiplexer-demultiplexer according to claim 1, wherein the network is a plane network working in reflection, the optical system is a spherical mirror, the focus of the mirror being on the network, the endpoints of the input-output and transmission lines being close to the centre x axis of the mirror, and the network being inclined in such a way as to work according to its blaze order.

8. Multiplexer-demultiplexer according to claim 7, wherein the spherical mirror and the network are formed, respectively, at the endpoints of what of a first block of glass.

9. Multiplexer-demultiplexer according to claim 8, wherein the endpoints of the lines are fixed to a second block of glass, integral with the first block of glass through glueing.

10. Multiplexer-demultiplexer according to claim 8, wherein the first block of glass is composed of two elements glued one to the other.

11. Multiplexer-demultiplexer according to claim 1, wherein the network and the optical system are made together by a concave network with a plane field.

12. Multiplexer-demultiplexer according to claim 1, wherein it comprises several transmission lines.

* * * * *